United States Patent [19]

Jones

[11] 3,763,881
[45] Oct. 9, 1973

[54] LIQUID LEVEL CONTROL DEVICES

[76] Inventor: Hugh Gwynfryn Jones, 87 Holywell Dr., Loughborough, Leicestershire, England

[22] Filed: Aug. 25, 1971

[21] Appl. No.: 174,792

[52] U.S. Cl. .................................. 137/414, 251/45
[51] Int. Cl. ......................... E03d 1/32, F16k 31/18
[58] Field of Search ............................ 137/245, 414; 251/35, 45, 46

[56] References Cited
UNITED STATES PATENTS

| | | | |
|---|---|---|---|
| 209,867 | 11/1878 | Craigie | 137/414 |
| 613,802 | 11/1898 | Kenney | 251/35 |
| 2,213,753 | 9/1940 | Teahen | 137/414 |
| 2,228,552 | 1/1941 | Arbogast | 137/414 |
| 3,387,620 | 6/1968 | Walters | 137/414 |

Primary Examiner—Martin P. Schwadron
Assistant Examiner—David R. Matthews
Attorney—Felshin & Feldman

[57] ABSTRACT

A device for controlling a flow of liquid from a liquid pressure source comprising a main valve which is actuated by application of the liquid pressure of the source under the control of a pilot valve, in the case of a float controlled valve for a reservoir the pilot valve is actuated directly by a float in the reservoir; the construction reduces to a minimum the dimensions of float required and provides accurate control of the liquid level in the reservoir. The device also includes a flow restrictor which is mounted on a control member of the main valve, the latter being supported by an annular diaphragm which is moved by the applied liquid pressure to close the outlet of the main valve, and is arranged to restrict the liquid flow as the control member approaches the closed position; this prevents concussive shock in the flow of liquid.

4 Claims, 3 Drawing Figures

LIQUID LEVEL CONTROL DEVICES

This invention is concerned with devices for controlling a flow of liquid from a pressure source. In particular, but not exclusively, it is concerned with controlling such a flow of liquid into a reservoir, e.g. a domestic water cistern so as to maintain a predetermined level of liquid in the latter.

One well-known and widely used device for the latter purpose is the so-called ball-cock. In the known form of ball-cock a ball floats on the liquid in the reservoir and is connected by an arm to the control member of a valve arranged in a liquid supply line to the reservoir. The arrangement is such that, as the ball rises with the liquid level in the reservoir, the valve is moved towards a closed position; conversely as the liquid level falls the valve is opened.

A problem which is associated with this known device is that the force which is required to actuate the control member to close the valve against the liquid pressure must be developed by the ball as it rises. Therefore, size of the ball and the length of the arm on which it is supported must be selected to give the ball sufficient leverage to actuate the control member of the valve against the liquid pressure. The necessarily large dimensions elevate the cost of these components and, in applications where the liquid concerned is drinking water, necessitates the use of brass; such a material is inherently expensive. Furthermore, in order to reduce the dimensions of the ball so as to minimise the space required by the latter, the length of the arm must be increased. This means that the distance over which the ball moves between the fully open and closed positions of the valve is proportionately increased. As a result the valve is gradually closed as the liquid level rises towards the predetermined level. This results in an undesirable amount of noise as the flow is throttled. Also, the gradual closure of the valve as the level rises increases the time taken to refill the reservoir to the predetermined level.

One object of the present invention is to provide a device for controlling a flow of liquid from a source under pressure which requires a relatively small actuating force so that the above defects can be obviated.

The present invention provides a device for this purpose comprising a control valve having a valve chamber connecting an inlet from the liquid pressure source and an outlet; a control member movable between positions in which the outlet is open and closed with respect to the inlet; a sub-chamber connected with the liquid source and having a movable wall constituted by the control member; a pilot valve controlling the pressure in the sub-chamber; and means controlled by a float, e.g. a ball, in the liquid reservoir arranged to actuate the pilot valve to raise the pressure in the sub-chamber in response to the level in the reservoir reaching the predetermined level and thereby move the control member into the position in which the outlet is closed.

Thus the idea behind this aspect of the invention is that, by utilizing a device of the kind in which the available liquid pressure is used to operate the control member of the control valve, the dimensions of the actuating mechanism, e.g. the float or ball, and its associated connections with the device, may be greatly reduced as compared with conventional ball-cocks.

One immediately obvious advantage accruing from this is that the cost of the actuating mechanism is greatly reduced as the float or ball need only be very light; therefore the arm on which is it supported may be similarly light. This means that the brass components of known ball-cocks can be replaced by plastics components.

A further most important advantage in the above application is that the float or ball need only move a small distance to operate the pilot valve. Thus the device, when in use, is able to maintain a full flow of liquid into the reservoir for a much longer period before the control valve commences closing. The period over which the liquid flow is throttled is thereby reduced to a minimum so that the device is much quieter in operation and the reservoir is filled more quickly than with the use of known ball-cocks.

A second most important aspect of the invention sets out to ensure that, in a device of the kind set out above in which the available liquid pressure is utilized to operate a control member of a control valve, the control member closes the valve at a controlled rate which obviates the possibility of concussive shock in the liquid supply.

According to this aspect of the invention in a device of the kind set out the control member is constituted by a disc supported for movement in a valve chamber by means of a resilient annular diaphragm; an outlet of the valve chamber is formed with an annular valve surface against which the disc abuts when in the closed position to close the outlet; the control member constitutes a partition between the valve chamber and a sub-chamber and liquid is bled from an inlet of the valve to the sub-chamber through a bleed hole in the disc of the control member, the pressure in the sub-chamber being controlled by a pilot valve in an outlet from the sub-chamber; and a perforate flow restrictor member is supported on the disc centrally of the annular valve surface of the outlet in an axially movable fashion with respect to the disc and contacts the valve surface as the disc approaches the closed position so reducing the flow through the outlet before the latter is closed by the disc.

Because the control member constitutes a partition between the valve chamber and the sub-chamber, the rate at which the valve closes depends on the difference in the liquid pressures in the two chambers. The difference in pressure depends on the size of the bleed hole, which controls the rate at which the pressure rises in the sub-chamber when the pilot valve is closed and also on the rate at which liquid is allowed to escape through the outlet.

When the perforate flow restrictor is omitted it has been found that the device shuts extremely rapidly and concussive shock can result in the supply liquid. This arises, it is thought, from the changes in pressure in the valve chamber and from consequent changes in the shape of the diaphragm as the disc approaches the valve surface. It is found that, without the flow restrictor, the flow rate from inlet to outlet is maximum, i.e. is determined solely by the sizes of the inlet and outlet, as long as the ratio $d/R$ (where $d$ is the distance of the disc from the valve surface and $R$ is the radius of the latter) is equal to or greater than 0.4. As the disc approaches the valve surface the flow rate decreases until a critical value of $d/R$ of about 0.1 is reached. At this critical value the flow rate is about 60 percent of maximum. Beneath this value it is found that several factors caused the disc to close very rapidly and concussive shock can result. Firstly the diaphragm is found to deflect into the sub-chamber at around the critical value, and, since the volume of liquid in the sub-chamber is constant during short term effects, the resulting pressure increase causes the disc to move more rapidly towards the valve surface to restrict the flow. Secondly the venturi effect caused by the liquid passing between the disc and the valve surface increasingly restricts the flow as the ratio d/R decreased, this draws the disc towards the closed position with increasing force as the dimensions of the flow passage are reduced.

With the perforate flow restrictor in use the above effects are entirely eliminated. The flow restrictor is brought into contact with the valve surface as the disc approaches the latter and reduces the flow rate through the valve so that the final movement of the disc to close the outlet is controlled solely by the rate at which liquid through the bleed-hole into the sub-chamber. The flow restrictor also generates a back pressure on the disc which compensates for the fall in pressure in the outlet.

It was also discovered that when the liquid to be controlled is water the size of bleed-hole required is so small as to render it prone to blockage by particles of dust, etc. in the water. Another important feature of the invention is the provision of a metering pin which is attached to a part of the valve and is arranged to extend through the bleed hole in the control member. The size of passage through the bleed hole is determined by the difference in cross-sectional size of the bleed hole and the metering pin and the movement of the control member relative to the pin provides a self-clearing action for removing particles from the bleed hole. The metering pin may be tapered so as to increasingly restrict the bleed hole as the disc approaches the valve surface of the outlet; this further reduces the speed of the final movement of the disc.

The accompanying drawings depict, by way of example, a float controlled device in accordance with the invention. In the drawings.

Figure 1:
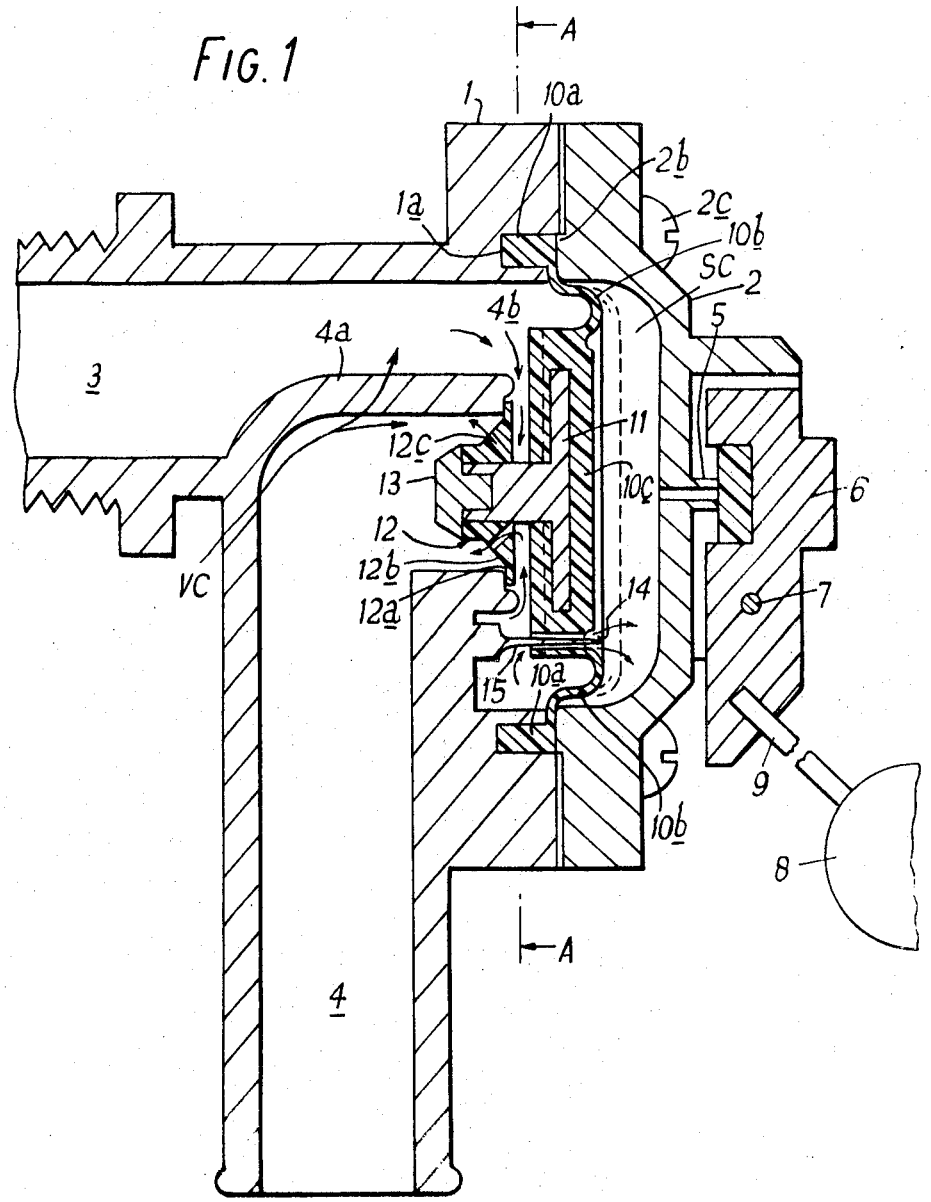
FIG. 1 is a section through such a device.
Figure 3:
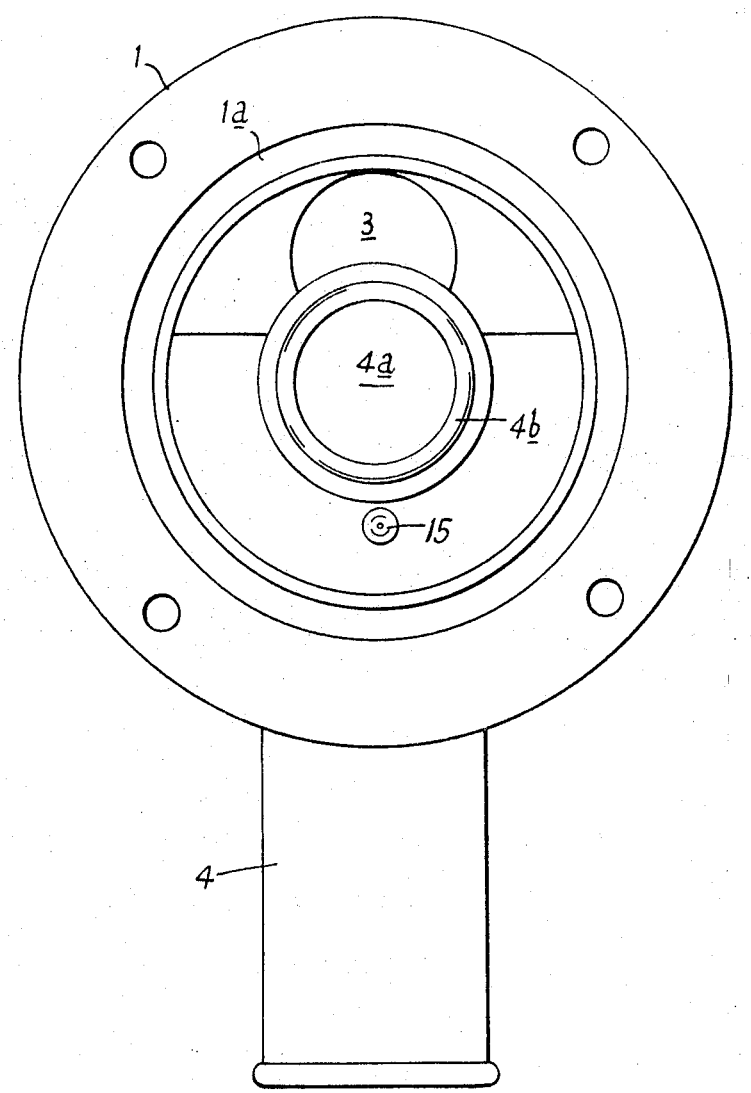
FIG. 3 is a view on arrows AA in FIG. 1.

Referring first to FIG. 1, the device comprises a body 1 having a domed cover 2. The body 1 defines the valve chamber VC of the invention and is provided with an inlet 3 and an outlet 4, the latter extending into the body 1 so as to form a central cylindrical passageway 4a (see also FIG. 3). The body is moulded from a plastics material Kemetal (RTM). Alternatively these parts could be formed from suitable metals, ceramics or thermoplastic or thermosetting materials.

The domed cover 2 defines the sub-chamber SC of the invention and is provided with a pilot valve constituted by restricted outlet tube 5 controlled, when the device is in use, by a closure member 6 which is pivotally attached to the cover 2 by a pin 7 and is actuated by a ball 8 through the medium of an arm 9. A sealing pad of Neoprene rubber (RTM) is secured in a counter bore in the member 6 and seals the outlet tube 5 when the ball 8 is raised, i.e. when the arm 9 is rotated in an anti-clockwise direction in FIG. 1.

The valve chamber VC is partitioned from the sub-chamber SC by means of a control member constituted by a circular diaphragm 10 of Neoprene (RTM) rubber reinforced in the centre by a brass insert 11. The diaphragm 10 is formed around its periphery with a stiffening rib 10a which is received in a complementarily formed groove 1a in the body 1 and is clamped in position by means of an annular rib 2b in the domed cover 2 when the latter is fixed in position by means of four self-tapping screws, one of which is shown at 2c.

The diaphragm 10 thus provides a resilient annular portion 10b and a stiffening central disc portion 10c. A circular perforate flow restrictor 12 is secured in a manner which permits limited axial movement to the centre of disc portion 10c by means of a stud 13.

As can be seen in FIG. 1, the disc portion 10c and the flow restrictor 12 are arranged centrally with respect to the cylindrical passageway 4a and by suitably flexing the annular portion 10b can be brought into contact with a valve surface 4b formed around the end of a passageway 4a so as to close the latter. In the drawing the diaphragm is shown in full line in a partly closed position (to be explained more fully hereinafter) and is indicated in dotted line in the open position. A bleed hole 14 between the valve chamber VC and the sub-chamber SC is defined by an aperture in the disc portion 10c of the diaphragm 10 and a specially formed metering pin 15 which is formed in a wall of the body 1 extends centrally through the aperture so as to determine the dimensions of the annular passage which defines the bleed hole. The special form of the pin 15 will be described in detail hereinafter. It is to be noted, however, that the dimensions of the bleed hole 14 are less than the dimension of the restricted outlet tube 5.

Figure 2:
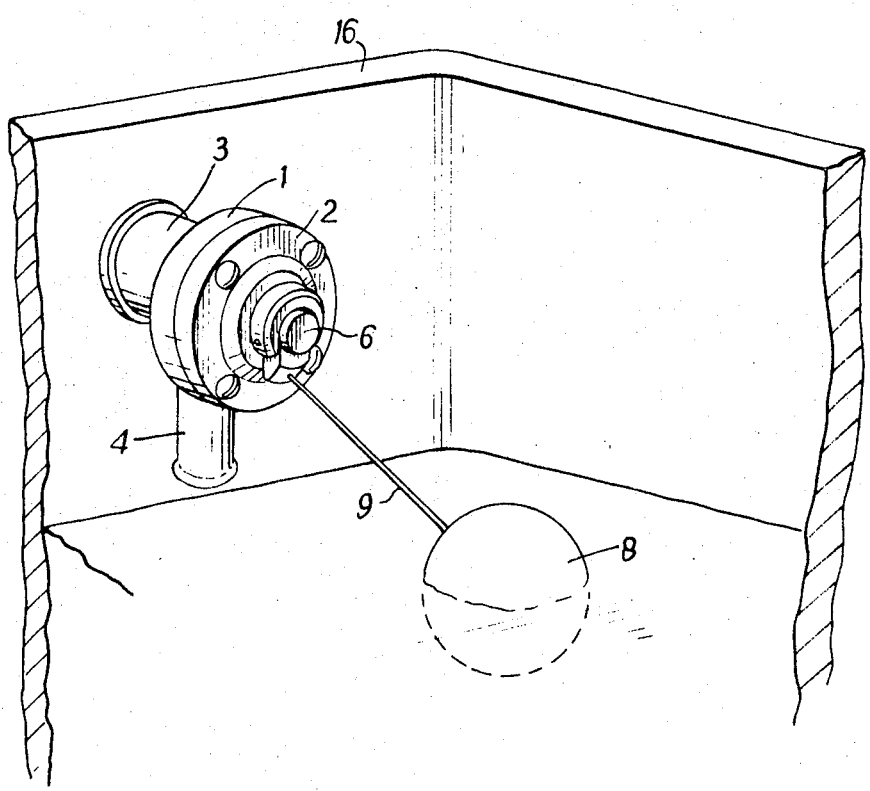
FIG. 2 shows the device of FIG. 1 in use in a water cistern.

In use of the device the inlet 3 is secured in the wall of a liquid reservoir (shown at 16 in FIG. 2) and is connected with a supply pipe (not shown) where it enters the reservoir. The device is so arranged that the outlet 4 is directed downwardly towards the floor of the reservoir; the ball 8 thus hangs downwards rotating the arm 9 in a clockwise direction as shown in FIGS. 1 and 2, and opening the outlet tube 5. Thus, when water is supplied through the supply pipe, the pressure acting on the resilient portion 10b of the diaphragm moves the disc portion 10c clear of the valve surface 4b so as to permit the flow of water into the reservoir through the outlet 4. Water also flows into the sub-chamber SC through the bleed hole 14 but the pressure within the latter chamber remains low since the outlet tube 5 is open at this time and vents the water from the sub-chamber SC into the reservoir. When the water in the reservoir rises to the level of the ball 8, the latter commences to float and is lifted by the rising water thus rotating the arm 9 anti-clockwise as shown in FIG. 1 until, when the level of the water rises to the predetermined level, the Neoprene (RTM) sealing pad closes the outlet tube 5.

Closure of the outlet tube 5 raises the pressure in the sub-chamber SC at a rate which is determined by the size of the bleed hole 14 and as this pressure rises the diaphragm 10 is moved towards the left as shown in FIG. 1 so as to close the outlet 4.

In the event that the level of the liquid in the reservoir falls the ball drops thereby opening the outlet tube 5. As soon as the outlet tube 5 opens the pressure in the sub-chamber SC falls due to the relative ease that the water may leave this chamber as compared with that at which it may enter through the bleed hole 14. As a result of this fall in pressure in the sub-chamber SC, the liquid pressure at the inlet lifts the diaphragm 10 and establishes a full flow passage for liquid into the reservoir by way of the outlet 4. This passage remains open until the rising water within the reservoir again lifts the ball 8 thereby shutting the outlet 5 so that the diaphragm 10 is again pressed over the outlet 4 to close it.

It will be appreciated that the rate at which the diaphragm 10 moves is determined by the relative forces acting on the opposite sides of the diaphragm 10. When the latter is in the closed position, the pressure acting on each side of the diaphragm is substantially the same but the area over which the pressure acts is different, that is to say, the force acting to open the diaphragm is determined by the area of the latter which is exposed to the inlet pressure, that is the annular portion only of the diaphragm, whereas the force acting to hold the diaphragm closed is determined by the overall area of the diaphragm. It will be further appreciated that when the diaphragm is fully open, it is exposed to water pressure over its full area on both sides, the pressure acting on the disc portion 10c in the opening direction being determined by the back pressure existing in the outlet 4. Between the open and closed positions the area exposed to the sub-chamber SC and therefore acting to close the diaphragm, remains substantially constant whereas the area exposed in the valve chamber VC to the water pressure is effectively reduced as the diaphragm approaches the closed position and the back pressure in the outlet 4 falls. This, in conjunction with the factors previously discussed, tends to produce very rapid closure of the diaphragm 10 with consequent concussive shock in the supply. The flow restrictor 12 prevents concussive shock.

Thus it will be seen that the restrictor 12 is of hollow conical form and is provided with a peripheral annular seating portion 12a, designed to seat against the valve surface 4b within a rebate formed in the latter. The restrictor 12 is pierced by four apertures (two of which are shown at 12c) and is axially movable on its supporting stud 13 so that, when the diaphragm 10 is closing, the first contact with the valve surface 4b is made by the seating portion 12a of the restrictor 12, the hollow conical body of the restrictor being received within the outlet 4.

As the diaphragm 10 approaches the valve surface 4b as shown in FIG. 1 the restrictor 12 makes first contact with the valve surface and considerably reduces the rate of flow through the outlet 4, this restricted rate being determined by the dimensions of the apertures 12c. The water moving radially into the outlet passes through the gap between the diaphragm and the restrictor during the last stages of closure and generates a back pressure which acts against the closing diaphragm as soon as the restrictor comes to rest, in effect, cushioning the movement of the diaphragm through the critical stage of closure. When the diaphragm is open the conical surface of the restrictor 12 ensures that the latter is held against the surface of the diaphragm by the flow of water through the outlet, and so does not impede the flow of water through the valve.

FIG. 1 also shows the form of the metering pin 15. It will be observed that this pin is tapered so that, as the diaphragm 10 approaches the valve surface 4b, the rate of flow of water into the sub-chamber SC is reduced. This slows the rate in rise of pressure in the latter and further "cushions" the closure of the diaphragm. The restrictor pin also ensures that any particles in the water are unable to block the bleed hole 14.

The construction described incorporating the flow restrictor is particularly advantageous in the control of the water level in e.g. a cistern because, by suitably dimensioning the flow restrictor, the device can be rendered immune to the effects of transient changes in level, e.g. as caused by waves in the cistern.

It is to be noted that the improvements arising from the use of the restrictor and the metering pin are by no means confined to the particular application described hereinbefore; that is to say, such improvements may be advantageously applied to any liquid control valve in which the pressure of a liquid supply is utilized to operate a control member of a control valve.

It is envisaged that the control means of the pilot valve could be an electromagnetically actuated plunger or a bimetallic strip; the latter could be used in a liquid level control device or a thermostatically controlled tap.

I claim:

1. A device for controlling a flow of liquid from a pressure source, the device comprising a control valve having an inlet from the pressure source, an outlet, a valve chamber connecting the inlet and the outlet, and a control member movable between positions in which the outlet is open and closed with respect to the inlet, wherein the device further comprises a resilient annular diaphragm; a disc, which constitutes the aforesaid control member, supported centrally of the said diaphragm; an annular valve surface formed on the outlet of the valve chamber against which the control member abuts when in the closed position; a sub chamber partitioned from the valve chamber by the diaphragm and the control member; a bleeder connecting the sub chamber with the inlet; a pilot valve adapted to control the liquid pressure in the sub chamber whereby to control the position of the control member, and a perforate flow restrictor supported on the control member centrally of the annular valve surface and axially movably with respect to the control member, the flow restrictor being adapted to contact the valve surface as the control member approaches the closed position thereby to reduce the flow through the outlet before the latter is closed by the control member.

2. A device in accordance with claim 1, wherein the control member has an aperture and a pin extends through said aperture so as to define the dimensions of an annular passageway which constitutes the said bleeder and to ensure that said passageway cannot become obstructed by solid particulate material in the liquid.

3. A device in accordance with claim 2, wherein the pin is of tapered form and is arranged to reduce the dimensions of the bleeder as the control member approaches the closed position.

4. A device in accordance with claim 3, wherein the perforate flow restrictor is of hollow conical form, is supported on the control member with its annular base adjacent the latter and is adapted to be received within the outlet as the control member approaches the closed position.

* * * * *